United States Patent
Oswald et al.

(10) Patent No.: US 7,069,746 B2
(45) Date of Patent: Jul. 4, 2006

(54) METHOD FOR PRODUCING ULTRA-HIGH PURITY, OPTICAL QUALITY GLASS ARTICLES

(75) Inventors: Monika Oswald, Hanau (DE); Gerrit Schneider, Hanau (DE); Jürgen Meyer, Stockstadt/Main (DE)

(73) Assignee: Degussa AG, Dusseldorf (DE)

( * ) Notice: Subject to any disclaimer, the term of this patent is extended or adjusted under 35 U.S.C. 154(b) by 431 days.

(21) Appl. No.: 10/266,630

(22) Filed: Oct. 9, 2002

(65) Prior Publication Data

US 2003/0131627 A1    Jul. 17, 2003

Related U.S. Application Data

(60) Provisional application No. 60/330,899, filed on Nov. 2, 2001.

(51) Int. Cl.
    *C03B 19/09*    (2006.01)
    *C03B 11/06*    (2006.01)
    *C03B 5/00*     (2006.01)

(52) U.S. Cl. ............ 65/17.3; 65/17.5; 65/17.6
(58) Field of Classification Search .......... 65/17.2, 65/17.3, 17.5, 17.6, 32.2, 144
    See application file for complete search history.

(56) References Cited

U.S. PATENT DOCUMENTS 2,798,810 A * 7/1957 Goetzel et al. .......... 419/5
5,643,347 A * 7/1997 Werdecker et al. ........ 65/21.1
5,776,240 A   7/1998 Deller et al.
6,752,864 B1 * 6/2004 Meyer et al. ............. 106/483

FOREIGN PATENT DOCUMENTS

| EP | 0292179 A2 | 11/1988 |
| EP | 0519521 A2 | 12/1992 |
| EP | 0535388 A1 | 4/1993 |
| EP | 1074512 A2 | 2/2001 |
| JP | 63265835  | 11/1988 |

* cited by examiner

*Primary Examiner*—Carlos Lopez
(74) *Attorney, Agent, or Firm*—Venable LLP; Thomas G. Wiseman

(57) ABSTRACT

A method for producing ultra-high purity, optical quality, glass articles is disclosed which involves:

1. compacting metaloxide or metalloidoxide to granules having a mean particle size of less than about 1 millimeter;
2. optionally fully sintering the granules to produce high purity, artificial sand;
3. casting the artificial sand by conventional techniques, such as, slip casting, to form a high density, porous, green body;
4. optionally drying and partially sintering the green body;
5. optionally fully sintering the green body under vacuum; and
6. optionally hot isostatic pressing the green body.

8 Claims, No Drawings

METHOD FOR PRODUCING ULTRA-HIGH PURITY, OPTICAL QUALITY GLASS ARTICLES

This application claims benefit to provisional application No. 60/330,899, filed Nov. 02, 2001.

This invention relates to a method for producing ultra-high purity, optical quality glass articles.

Numerous investigators have attempted to apply the sol-gel technique to the production of optical quality glass products.

For example, Matsuyama et al., UK patent application No. GB 2,041,913, describes a gel casting method for producing "mother rods" from which optical waveguide fibers can be prepared wherein a solution of a silicon alkoxide is formed, allowed to gel so as to produce a porous preform, dried, and then sintered at a temperature below its melting temperature to produce the mother rod. The application describes a three step sintering process in which an atmosphere of oxygen and helium is used up to a temperature of 700° C., an atmosphere of chlorine and helium is used between 700° C. and 1000° C. and an atmosphere of just helium is used above 1000° C. As acknowledged in this application, drying the gel without cracking is difficult and can take as long as 10 days.

U.S. Pat. No. 4,419,115 to David W. Johnson, Jr., et al., describes a similar process for producing glass articles wherein fumed silica is mixed with a polar liquid to form a first sol, the first sol is gelled to form a first gel, the first gel is dried, heated to a temperature in the vicinity of 750–850° C., cooled, redispersed in a polar liquid to form a second sol, the second sol is gelled to form a second gel, the second gel is dried, and the dried second gel is sintered to form the glass article.

The Johnson et al. patent states that the heating of the first gel to 750–850° C. does not result in densification of the gel material. Specifically, the patent states that until final sintering, the BET surface area of its silica material remains essentially the same as that of fumed silica. With regard to sintering, the patent states that a helium atmosphere, which optionally contains chlorine, or a vacuum can be used during this step. Significantly, the patent employs the helium plus chlorine approach, and not the vacuum approach, in each of its examples. In practice, the process of the Johnson et al. patent, like the process of the Matsuyama et al. application, has been found to be subject to gel cracking problems.

In addition to the foregoing, sol-gel casting processes have also been described in Hansen et al., U.S. Pat. No. 3,535,890, Shoup, U.S. Pat. No. 3,678,144, Blaszyk et al., U.S. Pat. No. 4,112,032, Bihuniak et al., U.S. Pat. Nos. 4,042,361, and 4,200,445, and Scherer, U.S. Pat. No. 4,574,063, European patent publication No. 84,438, and Scherer et al., "Glasses from Colloids", Journal of Non-Crystalline Solids, 63: 163–172 (1984).

In particular, the Hansen et al. patent relates to a process in which an aqueous solution of colloidal silica particles is formed, dried to produce a gel, and the gel is sintered in a three step process, the first step comprising heating the gel to around 600° C. in a vacuum, the second step comprising flushing the gel with chlorine gas to remove bound water, and the third step comprising sintering the gel under vacuum by raising its temperature to 1200° C. The patent acknowledges the gel's high sensitivity to cracking during the drying process and states that drying times on the order of many days or weeks are needed to overcome this problem.

The Shoup patent, as well as the Blaszyk et al. patent, relate to a process in which gels are formed from soluble silicates, such as, alkali silicates. The dried gels can be used, for example, as filters, solid supports for catalysts, and the like, or can be consolidated into a solid glass body at temperatures ranging from 600–1700° C. The gels produced by the soluble silicate technique are generally stronger than those produced by other sol-gel procedures. This makes crack-free drying of the gel easier and also facilitates the production of large castings. Alkali silicate solutions, however, contain significant amounts of iron. Accordingly, a leaching step is required if high purity glass is to be produced. Leaching is also generally required if the final product is to be alkali-free. In one set of examples, the Shoup patent compares consolidating a gel in air with consolidating a gel under a reduced pressure. In some cases, the reduced pressure resulted in a consolidated product which did not include bubbles; in other cases, bubbles still remained.

The Bihuniak et al. patents describe processes for densifying fumed silica and other fumed metal oxides by forming a sol, drying the sol to form fragments, and densifying the fragments by calcining them at 1150–1500° C. Thereafter, the densified material can be milled, e.g., to an 8 to 10 micron average particle size, suspended in a casting medium, slip cast to form a porous preform, and fired to produce the desired finished product.

Because it employs fumed silica, the Bihuniak et al. process is more difficult to perform than the process of the present invention. For example, it is relatively difficult to form gels from fumed silica, and as acknowledged in the Bihuniak et al. patents, once formed, gels made from fumed silica tend to break up into large chunks, rather than small particles, as is desired. Further, extensive pollution abatement equipment is required to produce fumed silica since such production involves the creation of hydrochloric acid.

In addition, densified silica particles made from fumed silica tend to have higher impurity levels than the densified silica particles produced by the process of the present invention. These higher impurity levels are due in part to the fact that impurities, including trace amounts of radioactive materials, are introduced into the silica during the fuming process.

The higher impurity levels also arise from the fact that densification of particles made from fumed silica gels requires higher temperatures than densification of particles formed from gels prepared in accordance with the present invention, i.e., densification of particles made from fumed silica gels require temperatures above, rather than below, 1150° C. Such higher temperatures generally mean that metal-containing furnaces must be used to perform the densification. The use of such furnaces, in turn, means that the silica particles will be exposed to and thus will pick up metal ions which are released from the walls of the hot furnace. In addition to the purity problem, the need to generate higher temperatures to achieve densification is in general undesirable.

The Scherer references describe forming a gel from fumed oxides in a non-aqueous medium, e.g., an organic medium, drying the gel, exposing the dried gel to vacuum for a few hours and heating the gel in oxygen to remove residual organic constituents, and then sintering the gel in a helium or helium plus chlorine atmosphere.

As with various of the sol-gel techniques described above, the gels produced by the Scherer technique are relatively fragile and thus must be carefully handled to avoid cracking. Also, as is typical of processes in which gels are sintered, gels prepared in accordance with the Scherer process undergo a linear shrinkage of approximately 40% upon sintering. Such a shrinkage level makes it relatively difficult to cast complex shapes and also leads to relatively high levels of gel fracture during sintering. In addition to the foregoing, because the Scherer process uses fumed silica, it suffers from the impurity and pollution control problems associated with the fuming process (see discussion above).

The use of hot isostatic pressing ("hipping"), as well as other pressing techniques, to compress gas bubbles in vitreous materials has been described in a number of references. See Rhodes, U.S. Pat. No. 3,310,392, Bush, U.S. Pat. No. 3,562,371, Okamoto et al., U.S. Pat. No. 4,358,306, and Bruning et al., U.S. Pat. No. 4,414,014 and UK patent application No. 2,086,369. The Bush patent, in particular, discloses forming a green body, sintering the body in a vacuum, and then subjecting the consolidated body to isostatic pressure at a temperature equal to or greater than the sintering temperature.

In view of the foregoing state of the art, it is an object of the present invention to provide an improved process for producing optical quality, high purity, glass articles. In particular, it is an object of the invention to provide a process for producing such articles which involves the sintering of a porous silica body but avoids the cracking, shrinkage and purity problems encountered in prior art processes of this type.

With regard to products, it is an object of the invention to provide ultra-pure silica granules which can be used in a variety of conventional ceramic forming processes, such as, powder pressing, extrusion, slip casting, and the like, to produce green bodies. It is an additional object of the invention to produce glass articles of complex shapes which have higher purities, more uniform transmittance characteristics, and smaller index of refraction variations, i.e., better homogeneity, than similar articles produced by prior art techniques. It is a further object of the invention to economically produce optical waveguide fibers which have transmission characteristics equivalent to optical waveguide fibers produced by more expensive techniques.

Subject of the invention is a method for producing a fused glass article comprising the steps of:

a) compacting metaloxide or metalloidoxide into granules having a mean particle size less than about 1 millimeter;
b) optionally sintering the granules at a temperature less than about 1,100° C., the density of the granules after sintering being approximately equal to their maximum theoretical density;
c) forming a green body from the granules or mixture or mixture of the granules, according to step a) and/or b) using uniaxial, cold isostatic and hot isostatic powder pressing, slip casting, extrusion, moulding and injection moulding;
d) optionally drying and partially sintering the green body in a chamber by:
  I) raising the temperature of the chamber optionally to above about 1,000° C., e.g., to 1,150° C., and optionally introducing chlorine gas into the chamber and/or purging the chamber with an inert gas and/or subjecting the chamber to a vacuum;
e) optionally fully sintering the green body in a chamber within a temperature range from about 1,200° C. to a temperature above about 1,720° C. while optionally purging the chamber with helium or preferably applying a vacuum to the chamber and
f) optionally hot isostatic pressing the fully sintered green body in a chamber by raising the temperature of the chamber to above about 1,150° C. and introducing an inert gas into the chamber at a pressure above about 100 psig (=6.895 bar). Preferably above 1,000 psig (=68.95 bar) and more preferably above about 15,000 psig (=1,034.25 bar).

Particular process steps can also be omitted depending on the specific conditions used and the purity requirements of the final product. For example, chlorine treatment may not be required in step (d) if the finished product does not have to have a low water content. Other modifications of this type are discussed below in connection with the description of the preferred embodiments of the invention.

Unlike prior art techniques which have employed sol-gel technology, the foregoing method provides a practical procedure for commercially producing ultra high purity, optical quality glass articles. The success of this technique is due to a number of factors. In the first place, the technique of the present invention does not use sol-gel technology to form a green body.

In addition to using metaloxide or metalloidoxide granules, the method of the invention also carries the high purity level of the granules through to the final product and, at the same time, produces a finished product having excellent optical properties. In particular, the oxygen and chlorine treatments during the drying of the green body specifically reduce the level of water in the finished product. In addition, the use of the preferred vacuum sintering means that any bubbles or similar defects which are created during sintering will in essence be empty voids. These empty spaces can be easily closed during hipping.

In a preferred subject of the invention the compacting of the metaloxides or metaloidoxides can be prepared by dispersing the metaloxides or metaloidoxides in water, spray drying it and heating the granules obtained at a temperature of from 150 to 1,100° C. for a period of 1 to 8 h.

In preferred subject of the invention the metaloxide or metalloidoxide can be silica granules i.e.:

a) pyrogenically produced silicon dioxide, which has been compacted to granules having
  a tamped density of from 150 g/l to 800 g/l,
  a granule particle size of from 10 to 800 μm and
  a BET surface area of from 10 to 500 $m^2/g$, or
b) pyrogenically produced silicon dioxide, which has been compacted to granules, having the following physico-chemical data:

mean particle diameter: from 25 to 120 µm,
BET surface area: from 40 to 400 m²/g,
pore volume: from 0.5 to 2.5 ml/g,
pore distribution: no pores with a diameter <5 nm, only meso- and macro-pores are present,
pH value: from 3.6 to 8.5,
tamped density: from 220 to 700 g/l.

The compacting step can be made according to U.S. Pat. No. 5,776,240.

In a preferred embodiment of the invention, a pyrogenically produced silicon dioxide, which has been granulated or compacted in a known manner according to U.S. Pat. No. 5,776,240 can be used in the production of sintered materials.

The silicon dioxide so compacted or granulated can be a pyrogenically produced oxide having a BET surface area of from 10 to 500 m²/g, a tamped density of from 150 to 800 g/l and a granule particle size of from 10 to 800 µm.

According to the invention, mixtures of compacted and uncompacted silicon dioxide can also be used.

Hereinbelow, the expressions "pyrogenically produced silica", "pyrogenically produced silicon dioxide", "pyrogenic silica" and "pyrogenic silicon dioxide" are to be understood as meaning very finely divided, nanoscale powders produced by converting gaseous silicon chloride, such as, for example, methyltrichlorosilane or silicon tetrachloride in a high temperature flame, wherein the flame is fed with hydrogen and oxygen and water vapor can optionally be supplied thereto.

Hereinbelow, the term "granule" is to be understood as meaning pyrogenically produced silicon dioxide powders highly compacted by means of the compaction process described in U.S. Pat. No. 5,776,240 or analogously to that process.

c) For the method according to the invention, either pyrogenically produced silicon dioxide, which has been compacted to granules by means of a downstream compacting step according to DE 196 01 415 A1 is used, which corresponds to U.S. Pat. No. 5,776,240, having a tamped density of from 150 g/l to 800 g/l, preferably from 200 to 500 g/l, a granule particle size of from 10 to 800 µm and a BET surface area of from 10 to 500 m²/g, preferably 20 to 130 m²/g, or granules according to U.S. Pat. No. 5,776,240, based on pyrogenically produced silicon dioxide are used, having the following physico-chemical data:
mean particle diameter from 25 to 120 µm;
BET surface area from 40 to 400 m²/g
pore volume from 0.5 to 2.5 ml/g
pore distribution: no pores with a diameter <5 nm, only meso- and macro-pores are present,
pH value: from 3.6 to 8.5,
tamped density: from 220 to 700 g/l.

In the example according to the invention the following presintering compositions can be used:

a) A pyrogenically produced silicon dioxide having a BET surface area of 90 m²/g and a bulk density of 35 g/l and a tamped density of 59 g/l is compacted to a granule according to U.S. Pat. No. 5,776,240.
The compacted silicon dioxide has a BET surface area of 90 m²/g and a tamped density of 246 g/l.

b) A pyrogenically produced silicon dioxide having a BET surface area of 50 m²/g and a tamped density of 130 g/l is compacted to a granule according to U.S. Pat. No. 5,776,240.
The compacted silicon dioxide has a BET surface area of 50 m²/g and a tamped density of 365 g/l.

c) A pyrogenically produced silicon dioxide having a BET surface area of 300 m²/g and a bulk density of 30 g/l and a tamped density of 50 g/l is compacted according to U.S. Pat. No. 5,776,240.
The compacted silicon dioxide has a BET surface area of 300 m²/g and a tamped density of 289 g/l.

d) A pyrogenically produced silicon dioxide having a BET surface area of 200 m²/g and a bulk density of 35 g/l and a tamped density of 50 g/l is compacted according to U.S. Pat. No. 5,776,240.
The compacted silicon dioxide has a BET surface area of 200 m²/g and a tamped density of 219 g/l.

The metaloxide or metalloidoxide to be used according to the invention can be granules based on pyrogenically prepared silicon dioxide doped with aluminium oxide by means of an aerosol, which granules have the following physico-chemical characteristic data:

| | |
|---|---|
| mean particle diameter: | from 10 to 150 µm |
| BET surface area: | from 25 to 100 m²/g |
| pH-value: | from 3 to 6 |
| tamped density: | from 400 to 1200 g/l |

In a preferred embodiment of the invention, the granules may have the following physico-chemical characteristic data:

| | |
|---|---|
| mean particle diameter: | from 15 to 30 µm |
| BET surface area: | from 60 to 70 m²/g |
| pH value: | from 4 to 6 |
| tamped density: | from 400 to 650 g/l |

These granules can be produced by dispersing in water pyrogenically prepared silicon dioxide doped with aluminium oxide by means of an aerosol, spray drying the dispersion, and optionally tempering the resulting granules at a temperature of from 150 to 1100° C. for a period of from 1 to 8 hours.

The pyrogenically prepared silicon dioxide doped with aluminium oxide by means of an aerosol may be a pyrogenically prepared silicon dioxide doped with aluminium oxide by means of an aerosol in which the base component is a silicon dioxide that has been prepared pyrogenically in the manner of flame oxidation or, preferably, of flame hydrolysis and that is doped with a doping component of from $1 \cdot 10^{-4}$ and up to 20 wt. %, the doping amount preferably being in the range from 1 to 10,000 ppm and the doping component being a salt or a salt mixture of aluminium or a suspension of an aluminium compound or of metallic aluminium or mixtures thereof, the BET surface area of the doped oxide being from 5 to 600 m²/g, preferably in the range from 40 to 100 m²/g.

The silicon dioxide doped with aluminium oxide may have a DBP number of less than 100 g/100 g.

The pyrogenically prepared silicon dioxide doped with aluminium oxide by means of an aerosol can be prepared by feeding an aerosol into a flame such as is used for the pyrogenic preparation of silicon dioxide in the manner of flame oxidation or, preferably, of flame hydrolysis, mixing the aerosol homogeneously with the gas mixture of the flame oxidation or flame hydrolysis before the reaction, then allowing the aerosol/gas mixture to react to completion in the flame and separating the resulting pyrogenically prepared silicon dioxide doped with aluminium oxide from the gas stream in a known manner, there being used to produce the aerosol an aqueous solution containing salts or salt mixtures of aluminium or the metal itself in dissolved or suspended form or mixtures thereof, the aerosol being produced by atomisation by means of a two-component nozzle or by a different method of aerosol production, preferably by means of an aerosol generator by ultrasonic atomisation.

There may be used as salts: $AlCl_3$, $Al_2(SO_4)_3$, $Al(NO_3)_3$.

The methods of flame hydrolysis for the preparation of pyrogenic oxides and also for the preparation of silicon dioxide (silica) are known from Ullmanns Enzyklopädie der technischen Chemie, 4th edition, Volume 21, page 464.

The spray drying may be carried out at a temperature of from 200 to 600° C. Disk-type atomisers or nozzle-type atomisers may be used.

Tempering of the granules may be carried out either in a stationary mass, such as, for example, in chamber ovens, or in a moving mass, such as, for example, rotary driers.

Pyrogenically prepared silicon dioxide, doped with aluminium oxide by means of an aerosol, that can be used according to the invention, and the process for its preparation, are known from EP 0 995 718 A1.

The according to EP 0 995 718 A1 pyrogenically prepared silicon dioxide doped with aluminium oxide by means of an aerosol is dispersed in demineralised water. A dispersing unit that operates according to the rotor/stator principle is used. The resulting dispersions are spray dried. The finished product is separated off over a filter or a cyclone.

Tempering of the spray granules may take place in muffle furnaces.

The data for the production of the granules according to the invention are given in Table 1.

The data for the resulting granules are given in Table 2.

The resulting granules can be used in the method of the invention.

TABLE 1

Data related to spray-drying of alumina-doped silica dispersion

| Test no. | Solids content oxide/$H_2O$ [g/l] | Atomisation with | Atomising disk speed [rpm] | Operating temperature [° C.] | Waste air temperature [° C.] | Spray drier |
|---|---|---|---|---|---|---|
| 1 | 150 | disk | 20,000 | 380 | 105 | Niro SD 12.5 |
| 2 | 150 | disk | 10,000 | 380 | 105 | Niro SD 12.5 |
| 3 | 150 | two-component nozzle | — | 260 | 105 | Anhydro Compakt |
| 4 | 200 | two-component nozzle | — | 260 | 105 | Anhydro Compakt |
| 5 | 250 | two-component nozzle | — | 260 | 105 | Anhydro Compakt |
| 6 | 300 | two-component nozzle | — | 260 | 105 | Anhydro Compakt |
| 7 | 350 | two-component nozzle | — | 260 | 105 | Anhydro Compakt |
| 8 | 450 | two-component nozzle | — | 260 | 105 | Anhydro Compakt |
| 9 | 600 | two-component nozzle | — | 260 | 105 | Anhydro Compakt |
| 10 | 600 | two-component nozzle | — | 380 | 110 | Niro SD 12.5 |
| 11 | 600 | two-component nozzle | — | 420 | 106 | Niro SD 12.5 |
| 12 | 600 | disk | 20,000 | 380 | 107 | Niro SD 12.5 |

TABLE 2

Physico-chemical data of spray-dried alumina doped silica

| Test no. | Tamped density [g/l] | Loss on drying [%] | Loss on ignition [%] | pH value | Spec. surface area (BET) [$m^2/g$] | $d_{50}$ value (Cilas) [μm] |
|---|---|---|---|---|---|---|
| 1 | 527 | 0.3 | 0.2 | 4.7 | 63 | 18 |
| 2 | 536 | 0.6 | 0.3 | 5.7 | 63 | 24 |
| 3 | 455 | 0.8 | 0.3 | 4.8 | 63 | 19 |
| 4 | 504 | 0.5 | 0.5 | 5.5 | 63 | 21 |
| 5 | 532 | 0.5 | 0.5 | 4.5 | 62 | 26 |
| 6 | 536 | 0.3 | 0.5 | 4.8 | 63 | 22 |
| 7 | 559 | 0.4 | 0.6 | 5.1 | 62 | 25 |
| 8 | 550 | 0.9 | 0.2 | 5.0 | 62 | 23 |
| 9 | 601 | 0.3 | 0.5 | 5.1 | 62 | 21 |
| 10 | 603 | 0.4 | 0.5 | 5.7 | 63 | 18 |
| 11 | 618 | 0.3 | 0.6 | 5.1 | 63 | 24 |
| 12 | 578 | 0.2 | 0.5 | 5.9 | 65 | 23 |

The metaloxide or metalloidoxide to be used according to the invention can be granules based on pyrogenic titanium dioxide with the following physico-chemical characteristics:

| | |
|---|---|
| Average particle diameter: | 10 to 150 μm |
| BET surface area: | 25 to 100 m²/g |
| pH: | 3 to 6 |
| Compacted density: | 400 to 1,200 g/l |

These granules can be prepared by dispersing pyrogenic titanium dioxide in water, spray-drying. They are known from the EP 1.078.883.

Spray-drying may be performed at a temperature of 200 to 600° C. Spinning disc atomisers or nozzle atomisers may be used (Table 4). The resulting granules are described in table 5.

A titanium dioxide P25 with the following physico-chemical characteristics is used as a pyrogenic titanium dioxide. It is disclosed in the series of documents called Pigments, no. 56 "Hochdisperse Metalloxide nach dem Aerosilverfahren", 4th edition, February 1989, Degussa AG (Table 3).

TABLE 3 physical-chemical datas of Titanium dioxide P25

| | | Titanium dioxide P25 |
|---|---|---|
| CAS no. | | 13463-67-7 |
| Behaviour in water | | hydrophilic |
| Appearance | | loose white powder |
| BET surface area [1] | m²/g | 50 ± 15 |
| Average size of primary particles nm | | 21 |
| Compacted density [2] | g/l | about 100 |
| Specific weight [10] | g/l | about 3.7 |
| Loss on drying [3] on leaving supplier (2 h at 105° C.) | % | <1.5 |
| Loss on ignition [4] [7] (2 h at 1000° C.) | | <2 |
| pH [5] (in 4% aqueous dispersion) | | 3–4 |
| $SiO_2$ [8] | | <0.2 |
| $Al_2O_3$ [8] | | <0.3 |
| $Fe_2O_3$ [8] | | <0.01 |
| $TiO_2$ [8] | | >99.5 |
| $ZrO_2$ [8] | | — |
| $HfO_2$ [8] | | — |
| HCl [9] | | <0.3 |
| Sieve residue [6] (Mocker's method, 45 μm) | % | <0.05 |

[1] according to DIN 66131
[2] according to DIN ISO 787/XI, JIS K 5101/18 (not sieved)
[3] according to DIN ISO 787/II, ASTM D 280, JIS K 5101/21
[4] according to DIN 55921, ASTM D 1208, JIS K 5101/23
[5] according to DIN ISO 787/IX; ASTM D 1208; JIS K 5101/24
[6] according to DIN ISO 787/XVIII; JIS K 5101/20
[7] with respect to substance dried for 2 h at 105° C.
[8] with respect to substance ignited for 2 h at 1000° C.
[9] HCl content is component of loss on ignition
[10] determined with an air comparison density bottle The titanium dioxides are prepared by spraying a volatile titanium compound into an oxyhydrogen flame formed from hydrogen and air. In most cases, titanium tetrachloride is used. This substance hydrolyses under the effect of the water being produced during the oxyhydrogen gas reaction to give titanium dioxide and hydrochloric acid. After leaving the flame, the titanium dioxide enters a so-called coagulation zone in which the titanium dioxide primary particles and primary aggregates agglomerate. The product, present at this stage as a kind of aerosol, is separated from the gaseous accompanying substances in cyclones and is then post-treated with moist hot air.

The particle sizes of the titanium dioxides may be varied by varying the reaction conditions such as, for example, temperature of the flame, proportion of hydrogen or oxygen, amount of titanium tetrachloride, residence time in the flame or the length of the coagulation zone.

The pyrogenic titanium dioxide is dispersed in fully deionised water. A dispersing apparatus is used which operates on the rotor/stator principle. The dispersions being produced are spray-dried. Deposition of the final product is achieved using a filter or a cyclone.

TABLE 4

Data relating to spray-drying aqueous TiO₂ P25 dispersions

| Example | Amount of H₂O [kg] | Amount of TiO₂ P25 [kg] | Atomised using | Speed of atomising disc [rpm] | Operating temp. [° C.] | Vent air temp. [° C.] | Deposition |
|---|---|---|---|---|---|---|---|
| 1 | 10 | 1.5 | disc | 35,000 | 345 | 100 | cyclone |
| 2 | 10 | 1.5 | disc | 45,000 | 370 | 105 | cyclone |
| 3 | 10 | 1.5 | disc | 20,000 | 350 | 95 | cyclone |
| 4 | 10 | 2.5 | disc | 15,000 | 348 | 100 | cyclone |
| 5 | 100 | 15 | 2-fluid nozzle | — | 445 | 130 | filter |
| 6 | 100 | 15 | disc | 10,000 | 450 | 105 | filter |
| 7 | 10 | 2.5 | disc | 20,000 | 348 | 105 | cyclone |
| 8 | 10 | 1.5 | disc | 15,000 | 348 | 105 | cyclone |
| 9 | 10 | 2.5 | disc | 35,000 | 300 | 105 | cyclone |

TABLE 5

Physico-chemical data of spray-dried TiO$_2$ P25 dispersions

| Example | BET surface area [m$^2$/g] | Compacted density [g/l] | pH | d$_{50}$ value (Cilas) [µm] | Loss on drying [%] | Loss on ignition [%] |
|---|---|---|---|---|---|---|
| 1 | 51 | 641 | 3.9 | 14.6 | 0.9 | 0.9 |
| 2 | 50 | 612 | 3.7 | 10.6 | 0.8 | 1.0 |
| 3 | 52 | 680 | 3.5 | 25.0 | 0.8 | 1.0 |
| 4 | 51 | 710 | 3.7 | 43.6 | 0.8 | 1.2 |
| 5 | 52 | 660 | 4.0 | 17.1 | 0.9 | 0.9 |
| 6 | 53 | 702 | 3.9 | 27.5 | 0.9 | 0.9 |
| 7 | 50 | 708 | 3.5 | 26.7 | 1.1 | 0.6 |
| 8 | 53 | 696 | 3.9 | 30.1 | 1.0 | 0.9 |
| 9 | 49 | 640 | 3.7 | 16.0 | 0.7 | 0.8 |

The metal oxides or metalloid oxides to be used according to the invention may be granules based on pyrogenically produced aluminium oxide having the following physico-chemical characteristics:

| | |
|---|---|
| Mean grain diameter: | 8.0 to 150 µm |
| Compacted bulk density: | 400 to 1,200 g/l |

In a preferred embodiment of the invention the granules may have a mean grain diameter of 8.0 to 41 µm and a compacted bulk density of 450 to 550 g/l.

The granules according to the invention may be produced by dispersing pyrogenically produced aluminium oxide in water, and spray drying and optionally tempering the granules obtained at a temperature from 150° to 1,100° C. for a period of 1 to 8 hours.

As educt there may be used an aluminium oxide such as is described in Ullmann's Enzyklopädie der technischen Chemie, 4th Edition, Vol. 21, p. 464 (1982).

There may furthermore be used as educt a pyrogenically produced aluminium oxide with a high surface area and having a specific surface according to BET of more than 115 m$^2$/g, and a Sears number of more than 8 ml/2 g.

With this aluminium oxide the dibutyl phthalate absorption of the powder measured on a 16 g weighed portion is no longer measurable (no end point recognition).

This pyrogenically produced aluminium oxide may be produced by a flame oxidation technique or preferably by flame hydrolysis, in which a vaporisable aluminium compound, preferably the chloride, is used as staring material. This aluminium oxide is described in DE 199 43 291.0-41.

The spray drying may be carried out at a temperature from 200° to 600° C. In this connection spray-disc atomisers or nozzle atomisers may be used, such as for example a single-substance nozzle or a gas-atomising nozzle.

The tempering of the granules may be carried out in a fixed bed, such as for example in chamber furnaces, as well as in a fluid bed, such as for example rotary dryers.

EXAMPLE 1

320 kg/hr. of previously vaporised aluminium trichloride (AlCl$_3$) together with 100 Nm$^3$/hr. of hydrogen and 450 Nm$^3$/hr. of air are combusted together in a burner of known design and construction.

The finely particulate, high surface area aluminium oxide is separated after the flame reaction in a filter or cyclone from the hydrochloric acid gases that are also formed, any still adhering HCl traces then being removed by treatment with moist air at elevated temperature.

The high surface area pyrogenic aluminium oxide that is produced has the physicochemical characteristics listed in Table 1. The data relating to the pyrogenic aluminium oxide commercially available from Degussa-Hüls AG/Frankfurt (trade name aluminium oxide C) are also listed in Table 1 for purposes of comparison.

TABLE 6

| | Unit | High Surface Area Aluminium Oxide Alu 130 | Aluminium Oxide C |
|---|---|---|---|
| BET Specific Surface | m$^2$/g | 121 | 100 |
| Sears No. (pH 4 to 9) | ml/2 g | 9.38 | 7.05 |
| pH | 4% aqueous dispersion | 4.93 | 4.5 |
| Drying Loss | wt. % | 3.3 | 3.0 |
| Bulk Density | g/l | 55 | 48 |
| Compacted Bulk Density | g/l | 63 | 57 |
| DBP Absorption | wt. % | Not measurable; no end point can be established | 231 |

DBP: dibutyl phthalate

The measurement of the Sears number is described in EP 0 717 088.

EXAMPLE 2

An aluminium oxide having the following physicochemical characteristics is used as pyrogenically produced aluminium oxide, and is described in the pigment information leaflet no. 56 "Highly Dispersed Metal Oxides According to the Aerosil Process", 4th Edition, February 1989, Degussa AG.

TABLE 7

|  | Aluminium Oxide C |
| --- | --- |
| CAS Reg. Number |  | 1344-28-1 |
| Surface according to BET[1] | m²/g | 100 ± 15 |
| Mean size of the primary particles | nm | 13 |
| Compacted bulk density[2] | g/l | ca. 80 |
| Specific weight[10] | g/ml | ca. 3.2 |
| Drying loss[3] on leaving the supplier's factory (2 hours at 105° C.) | % | <5 |
| Annealing loss[4)7] (2 hours at 1000° C.) | % | <3 |
| pH value[5] (in 4% aqueous dispersion) |  | 4.5–5.5 |
| $SiO_2$[8] |  | <0.1 |
| $Al_2O_3$[8] |  | <99.6 |
| $Fe_2O_3$[8] |  | <0.2 |
| $TiO_2$[8] |  | >0.1 |
| $ZrO2$[8] |  | — |
| $HfO2$[8] |  | — |
| $HCl$[8)9] |  | <0.5 |
| Sieving residue[6] (according to Mocker, 45 μm) | % | <0.05 |

[1] according to DIN 66131
[2] according to DIN ISO 787/XI, JIS K 5101/18 (not sieved)
[3] according to DIN ISO 787/II, ASTM D 280, JIS K 5101/21
[4] according to DIN 55921, ASTM D 1208, JIS K 5101/23
[5] according to DIN ISO 787/IX;ASTM D !"=(; JIS K 5101/24
[6] according to DIN ISO 787/XVIII; JIS K 5101/20
[7] referred to the substance dried for 2 hours at 105° C.
[8] referred to the substance annealed for 2 hours at 1000° C.
[9] HCl content is part of the annealing loss
[10] measured with an air comparison pycnometer To produce the aluminium oxides, a volatile aluminium compound is injected through a nozzle into an oxyhydrogen flame consisting of hydrogen and air. In most cases aluminium trichloride is used. This substance hydrolyses under the influence of the water produced in the oxyhydrogen reaction, to form aluminium oxide and hydrochloric acid. After leaving the flame the aluminium oxide enters a so-called coagulation zone in which the aluminium oxide primary particles and aluminium oxide primary aggregates agglomerate. The product present in the form of an aerosol in this stage is separated from the gaseous accompanying substances in cyclones and is then post-treated with moist hot air.

The particle sizes of the aluminium oxides may be varied by means of the reaction conditions, such as for example the flame temperature, proportion of hydrogen or oxygen, amount of aluminium trichloride, residence time in the flame, or length of the coagulation section.

Production of the Granules According to the Invention

The pyrogenically produced aluminium oxide is dispersed in fully deionised water. A dispersing device is used that operates according to the rotor/stator principle. The dispersions formed are spray dried. The finished product is separated using a filter or cyclone.

The tempering of the spray granules may be carried out in a muffle furnace.

The production conditions are given in Table 8. The data relating to the products obtained are listed in Table 9.

TABLE 8

Data relating to the spray drying of aqueous $Al_2O_3$ dispersions

| Exprmntl. Ref. No. | Amount $H_2O$ [kg] | Amount $Al_2O_3$ [kg] | Atomisation with | Rotational speed of spray-disc atomiser [rpm] | Operating temperature [° C.] | Waste air temperature [° C.] | Spray drier |
| --- | --- | --- | --- | --- | --- | --- | --- |
| 1 | 100 | 15 | Single-substance nozzle | — | 420 | 105 | Niro SD 12.5 |
| 2 | 100 | 10 | Single-substance nozzle | — | 412 | 102 | Niro SD 12.5 |
| 3 | 5 | 0.75 | Disc | 15,000 | 298 | 1058 | Niro Minor |
| 4 | 16.5 | 2.50 | Disc | 25,000 | 300 | 107 | Niro Minor |
| 5 | 20 | 3.0 | Disc | 35,000 | 300 | 105 | Niro Minor |
| 6 | 8 | 1.2 | Disc | 20,000 | 298 | 106 | Niro Minor |
| 7 | 600 | 90 | Disc | 10,000 | 437 | 100 | Niro SD 12.5 |
| 8 | 300 | 45 | Disc | 20,000 | 458 | 100 | Niro SD 12.5 |
| 9 | 50 | 7.5 | Gas-atomising nozzle | — | 260 | 105 | Anhydro Compakt |
| 10 | 300 | 45 | Gas-atomising nozzle | — | 458 | 108 | Niro SD 12.5 |
| 11 | 200 | 30 | Gas-atomising nozzle | — | 457 | 100 | Niro SD 12.5 |
| 12 | 4.25 | 0.75 | Gas-atomising nozzle | — | 380 | 105 | Niro Minor |

TABLE 9

Physicochemical data of the spray-dried products

| Exprmntl. Ref. No. | Compacted Bulk Density [g/l] | Drying Loss [%] | Annealing Loss [%] | pH Value | $d_{50}$ Value (Cilas) [μm] |
|---|---|---|---|---|---|
| 1 | 505 | 2.3 | 2.3 | 5.0 | 39.4 |
| 2 | 502 | 1.8 | 2.0 | 4.9 | 40.9 |
| 3 | 473 | 1.4 | 2.7 | 4.9 | 31.1 |
| 4 | 471 | 1.5 | 2.4 | 5.1 | 20.5 |
| 5 | 466 | 1.5 | 2.6 | 5.0 | 14.5 |
| 6 | 477 | 1.5 | 1.5 | 5.4 | 27.7 |
| 7 | 525 | 1.6 | 1.9 | 5.0 | 39.3 |
| 8 | 474 | 1.5 | 2.8 | 4.8 | 27.6 |
| 9 | 506 | 3.4 | 2.1 | 5.0 | 28.0 |
| 10 | 533 | 1.9 | 2.5 | 5.0 | 30.6 |
| 11 | 516 | 1.8 | 2.5 | 4.7 | 25.8 |
| 12 | 483 | 1.7 | 2.6 | 4.9 | 8.8 |

It has been found that by means of the invention, finished products of complex shapes, such as, optical domes, antenna windows, sight glasses, aerospace viewports, lenses, prisms, mirrors, etc., can be readily produced which have equivalent or better optical properties than similar products produced by other techniques. In particular, the products have been found to have higher purities, smaller index of refraction variations (better homogeneities), and more uniform transmittance characteristics from the ultraviolet through the infrared than similar commercial products which have heretofore been available. The method of the invention can be used to produce low loss, optical waveguide fibers. Significantly, in accordance with the invention, production costs for such fibers can be reduced.

The optional sintering of the granules is conducted at a temperature of less than about 1.100° C. This low sintering temperature allows the sintering to be conducted in the quartz reactor. The use of such reactor, as opposed to a metal furnace, helps maintain the purity of the granules through the sintering procedure.

The sintering can be performed in a variety of atmospheres. For example, helium, helium/oxygen, and argon/oxygen atmospheres can be used. In some cases, a helium atmosphere has been found preferable to an argon/oxygen atmosphere. The sintering can also be performed in air.

The granules can be used as a filler for potting sensitive electronic components, such as, semiconductor memory devices. In comparison with prior art silica fillers, the granules contain lower amounts of such radioactive materials as uranium and thorium, and thus produce less alpha particles which can interfere with the operation of state-of-the-art electronic components.

In accordance with the present invention, the granules are used to form high density green bodies. In particular, the granules are used as the starting material for such conventional processes as slip casting, injection molding, extrusion molding, cold isopressing, and the like. A description of these and other processes in which the granules of the present invention can be used can be found in such texts as Introduction to Ceramics, by W. D. Kingery, John Wiley and Sons, Inc., New York, 1960, and Ceramic Processing Before Firing, G. Y. Onoda, Jr., and L. L. Hench, editors, John Wiley and Sons, Inc., New York, 1978, the pertinent portions of which are incorporated herein by reference.

With regard to slip casting in particular, descriptions of this technique can be found in U.S. Pat. No. 2,942,991 and in Whiteway, et al., "Slip Casting Magnesia," Ceramic Bulletin, 40: 432–435 (1961), the pertinent portions of which are also incorporated herein by reference.

Such a slurry can be conveniently produced using a urethane-lined vibra-mill to which the granules, silica media, and water are added. Using a slurry of this type, high density green bodies, e.g., green bodies having a porosity on the order of 20%, are readily prepared.

For various of the other casting methods, e.g., the injection, extrusion, and pressing techniques, it is generally preferred to employ a binder in the slurry. Such a binder can be conveniently formed by in situ hydrolyzation of TEOS. By way of illustration, a slurry of the granules of the present invention was successfully cast in a plastic mold, as opposed to a plaster of Paris mold, by adding 5 milliliters of an acid-catalyzed TEOS/water mixture (4 moles water to each mole of TEOS) to 132 milliliters of slurry. After molding, 2–7 milliliters of a basic solution (1.2% ammonium carbonate) was added to the slurry. The basic solution shifted the pH causing the TEOS to gel within a period of from about 2 to about 30 minutes, thus binding the granules together to form a strong green body, well-suited for further processing. Alternatively, commercial binders, such as those sold by the Stauffer Chemical Company under the SILBOND trademark, can be used.

Once formed, the green body can be purified and consolidated by a two-step process. In the first step, the green body is dried and partially sintered. In the second step, the green body is fully sintered.

The drying and partial sintering step, among other things, serves to remove water from the green body which could form bubbles in the final product during full sintering. To minimize contamination, this step is preferably performed in a quartz tube furnace, although other types of furnaces can be used, if desired. When a quartz tube furnace is used, the temperatures employed are preferably kept below about 1150° C.

Drying and partial sintering are achieved by raising the temperature of the furnace to above about 1000° C., while introducing chlorine into the furnace and/or applying a vacuum to the furnace and/or purging the furnace with one or more inert gases, e.g., with argon and/or helium. The chlorine treatment, vacuum stripping and/or inert gas purging reduces the chances that the water content of the green body will cause bubbles to form during full sintering. In addition to removing water, the chlorine treatment has also been found to reduce the green body's iron, copper, and calcium levels. When the green body is formed by slip casting, the chlorine treatment's ability to strip calcium is of particular value since the green body tends to pick up calcium from the plaster of Paris mold.

Optionally, the drying and partial sintering step can include subjecting the green body to an oxygen-containing atmosphere to reduce its content of organic materials.

The oxygen treatment can be omitted if the green body includes only minor levels of organic material contamination. The chlorine treatment can be omitted in cases where the final product can have a relatively high water content, e.g., in cases where the absorption characteristics of the final product in the infrared region are not critical. When the chlorine treatment is omitted, either vacuum stripping or inert gas purging should be performed. If desired, both vacuum stripping and gas purging can be used sequentially. Either or both the vacuum stripping and the inert purging can be omitted when the chlorine treatment is used.

After the green body has been dried and optionally partial sintered, it is fully sintered at a temperature range, from about 1,200° C. to above about 1,720° C. Full sintering is preferably performed in a vacuum of, for example, $1 \times 10^{-5}$ torr. Alternatively, helium purging can be use, although this is less preferred since any bubbles which form in the glass during sintering will be filled with helium, rather than being empty, as occurs during vacuum sintering.

The full sintering of the cast granules can be performed in, for example, a tungsten-molybdenum furnace or a helium-filled graphite furnace. To minimize contamination, the green body is preferably supported on quartz cloth and monoclinic unstabilized zirconia A grain.

In general, full sintering, as well as cooling of the sintered product, can be completed in about 3 hours. Thereafter, if desired, the surfaces of the consolidated green body can be cleaned with hydrofluoric acid. Also, areas of the green body which may have become deformed during sintering, e.g., areas in contact with the quartz cloth, can be removed by grinding.

For certain applications, e.g., the production of consolidated preforms for optical waveguide fibers, the fully sintered green body may be ready for use without further processing. In most cases, however, it is preferred to hip the sintered green body to collapse any bubbles which may have formed in the body during the sintering process.

The hipping is performed in the pressure chamber of a hipping furnace (see, for example, U.S. Pat. No. 4,349,333) by heating the chamber to a temperature greater that the annealing point of the consolidated green body and less than about 1800° C., while introducing an inert gas, such as, argon, helium, or nitrogen, into the chamber at a pressure in the range of 100–45,000 psi (6,895 to 3.102,75 bar). In practice, temperatures in the range of 1150–1740° C. and pressures in the range of 1,000–30,000 psig (68,95 to 2.068,5 bar) have been found suitable for collapsing bubbles and other voids in consolidated green bodies produced in accordance with the present invention. Lower pressures, e.g., pressures in the 100–1000 psig (6,895 to 68,95 bar) range, can also be used.

To avoid contamination of the consolidated green body during hipping, it is preferred to wrap the body in glass wool and steel foil before it is placed in the hipping furnace. These precautions, however, can be omitted in the case of a "clean" furnace which has only been used to hip high purity silica materials.

After hipping has been completed, various conventional glass treatment procedures, such as, annealing, grinding, polishing, drawing, pressing, etc., can be applied to the fully sintered and hipped green body. The resulting finished product is then ready for use by the consumer.

The invention claimed is:

1. A method for producing a fused glass article comprising the steps of:
 a) compacting pyrogenically produced metaloxide or metalloidoxide to form granules having a mean particle size less than about one mm;
 b) forming a green body from the granules or mixture of the granules according to step a) using a technique selected from uniaxial, cold isostatic or hot isostatic powder pressing, slip casting, extrusion, moulding or injection moulding;
 c) drying the green body in a first chamber by raising the temperature of the first chamber to above about 1000° C.; and
 d) fully sintering the green body in a second chamber by raising the temperature of the second chamber within a temperature range from about 1,200° C. to a temperature above about 1,720° C.; and
 e) hot isostatic pressing the fully sintered green body in a third chamber by raising the temperature of the third chamber to above about 1,500° C. and introducing an inert gas into the third chamber at a pressure above about 100 psig (6.895 bar).

2. A method for producing a fused glass article comprising the steps of:
 a) compacting pyrogenically produced metaloxide or metalloidoxide to form granules having a mean particle size less than about one mm;
 b) sintering the granules at a temperature less than about 1,100° C., resulting in granules having a density approximately equal to their maximum theoretical density;
 c) forming a green body from the granules or mixture of the granules according to step a) using a technique selected from uniaxial, cold isostatic or hot isostatic powder pressing, slip casting, extrusion, moulding or injection moulding;
 d) drying the green body in a first chamber by raising the temperature of the first chamber to above about 1000° C.; and
 e) fully sintering the green body in a second chamber by raising the temperature of the second chamber within a temperature range from about 1,200° C. to a temperature above about 1,720° C.

3. The method of claim 1 wherein step c) further comprises partial sintering the green body in the chamber.

4. The method of claim 1 wherein step c) further comprises introducing chlorine gas into the chamber or subjecting the chamber to a vacuum or purging the chamber with an inert gas.

5. The method of claim 1 wherein step d) further comprises purging the chamber with helium or applying a vacuum to the chamber.

6. The method of claim 2 wherein step d) further comprises partial sintering the green body in the chamber.

7. The method of claim 2 wherein step d) further comprises introducing chlorine gas into the chamber or subjecting the chamber to a vacuum or purging the chamber with an inert gas.

8. The method of claim 2 wherein step e) further comprises purging the chamber with helium or applying a vacuum to the chamber.

* * * * *